United States Patent [19]

Kensrue

[11] Patent Number: 5,724,877
[45] Date of Patent: *Mar. 10, 1998

[54] TOOL FOR CUTTING FOOD PRODUCTS

[75] Inventor: Milo M. Kensrue, Irvine, Calif.

[73] Assignee: Bagel Trap, Inc., Irvine, Calif.

[*] Notice: The portion of the term of this patent subsequent to Mar. 19, 2013, has been disclaimed.

[21] Appl. No.: 294,376

[22] Filed: Aug. 23, 1994

Related U.S. Application Data

[63] Continuation-in-part of Ser. No. 33,899, Mar. 19, 1993, Pat. No. 5,361,666.
[51] Int. Cl.⁶ .................................................. B26D 3/30
[52] U.S. Cl. ........................... 83/870; 83/454; 83/459; 83/462; 83/465; 83/468.7; 83/72; 269/87.7
[58] Field of Search ........................ 83/157, 167, 455, 83/452, 454, 466.1, 467.1, 468.6, 468.7, 761, 762, 764, 765, 821, 829, 932

[56] References Cited

U.S. PATENT DOCUMENTS 1,721,937  7/1929  Williams .................................. 83/762
2,108,992  2/1938  Obenshain ............................... 83/762
3,971,273  7/1976  Peters et al. ............................ 83/157
4,550,636  11/1985  Josselson et al. ................... 83/762 X

*Primary Examiner*—Maurina T. Rachuba
*Attorney, Agent, or Firm*—John J. Connors; Connors & Assoc.

[57] ABSTRACT

A tool is used to hold a food product upright while a user manually cuts the food product by slicing the food product from edge to edge with a blade of a knife. The tool includes a base having a top surface adapted to support the food product, a pair of knife blade guide members attached to the base opposite each other and spaced apart to provide a cutting zone, and a cutting pad in the cutting zone comprising a polyester based thermoplastic polyurethane having a Shore A hardness between 75 and 100 that resists being cut by the blade of the knife as the blade cuts through the food product.

3 Claims, 9 Drawing Sheets

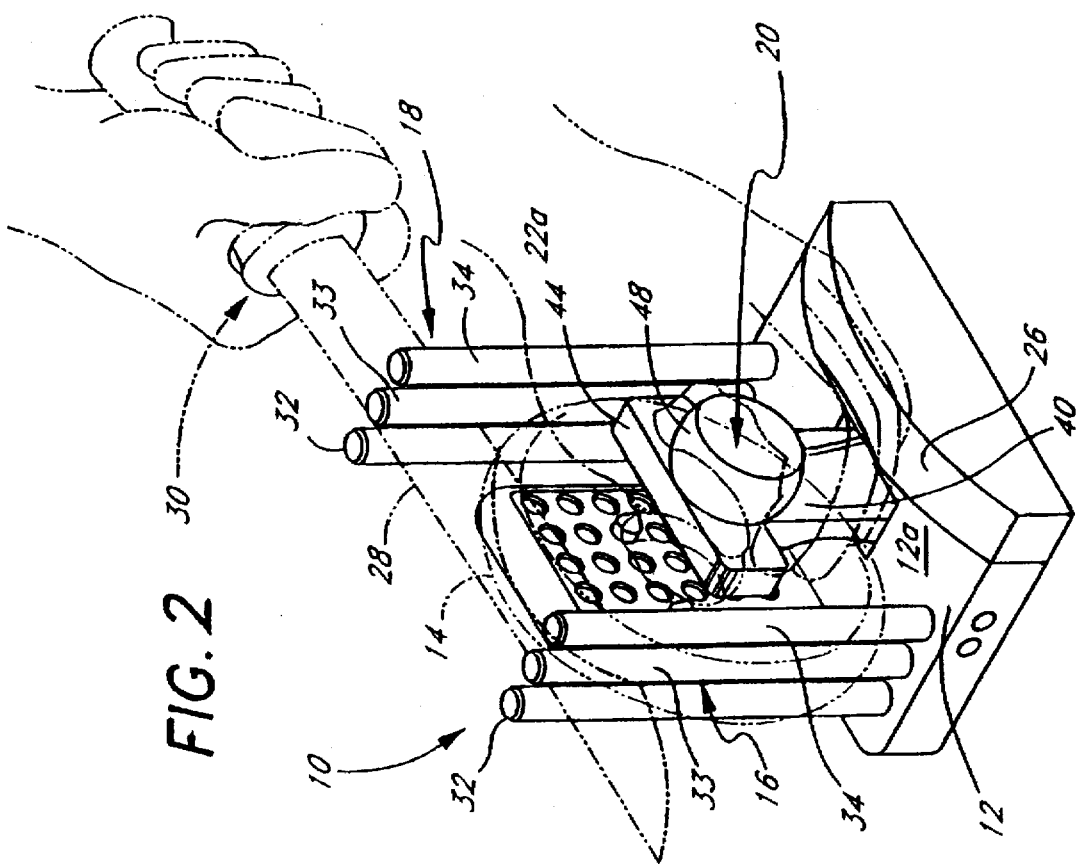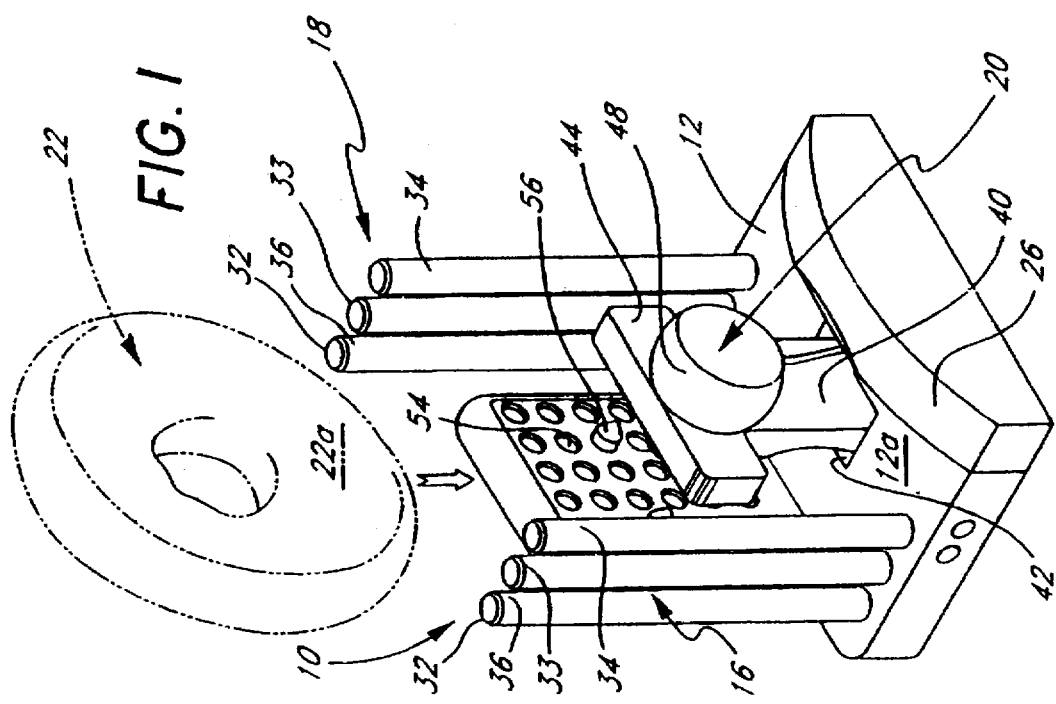

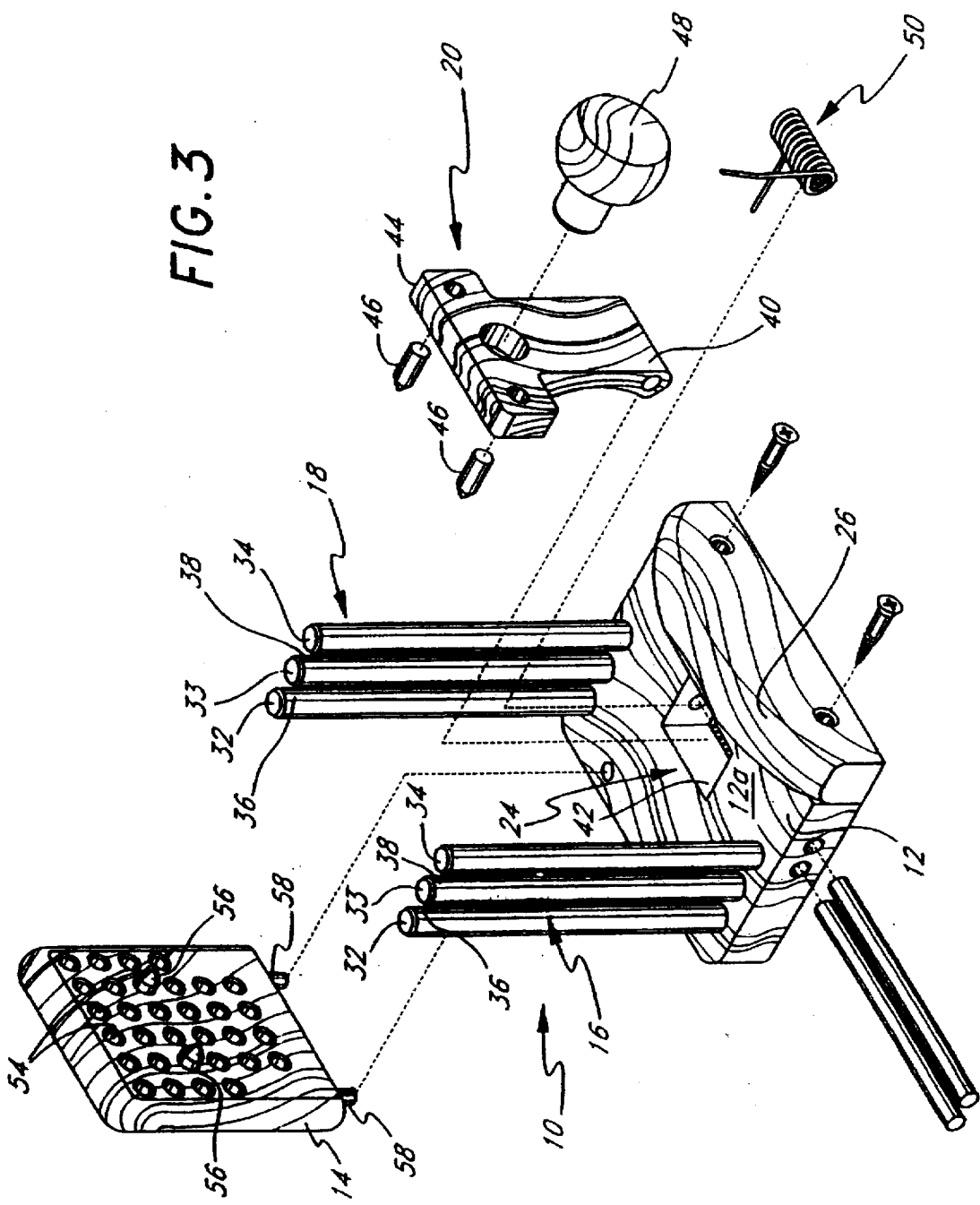

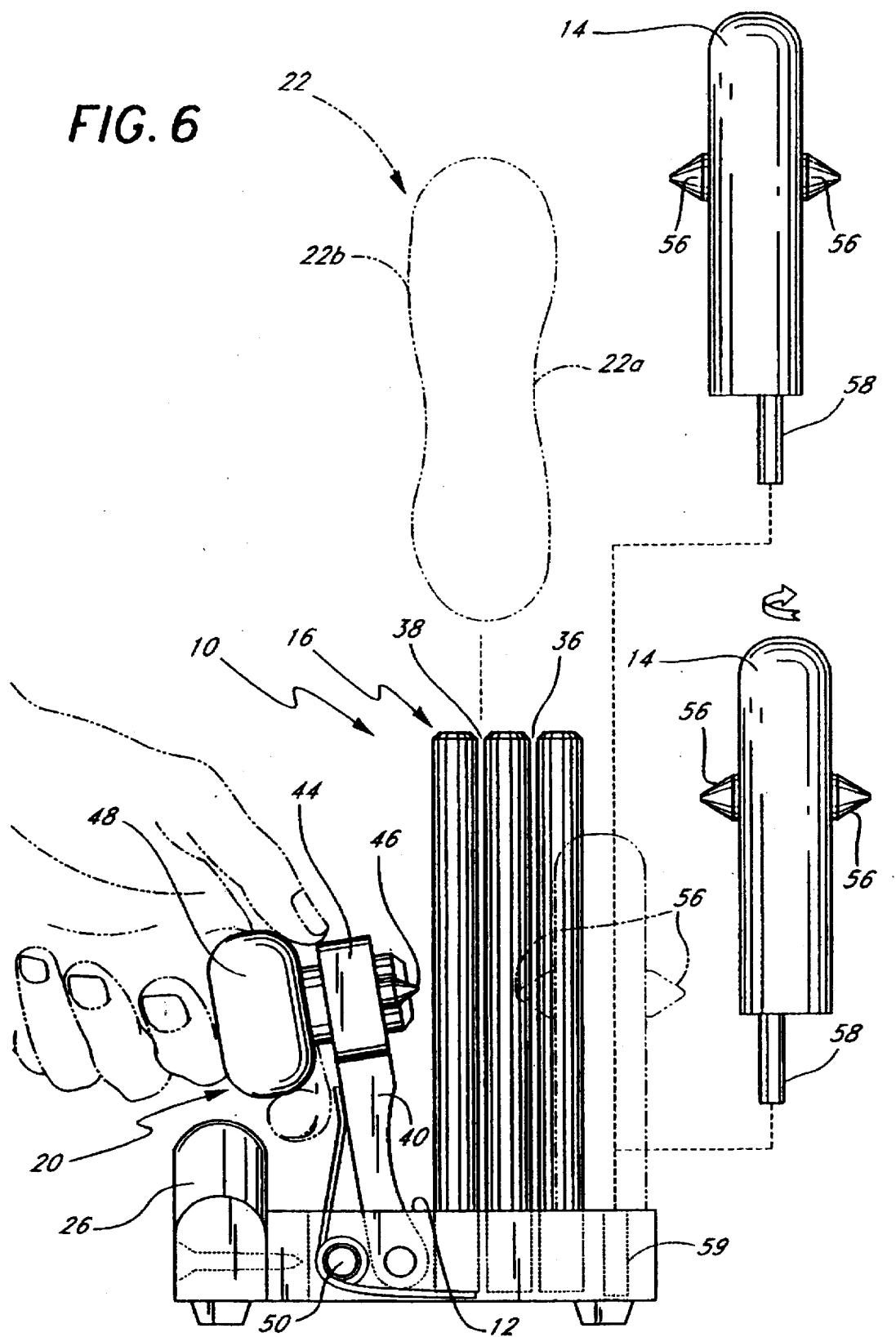

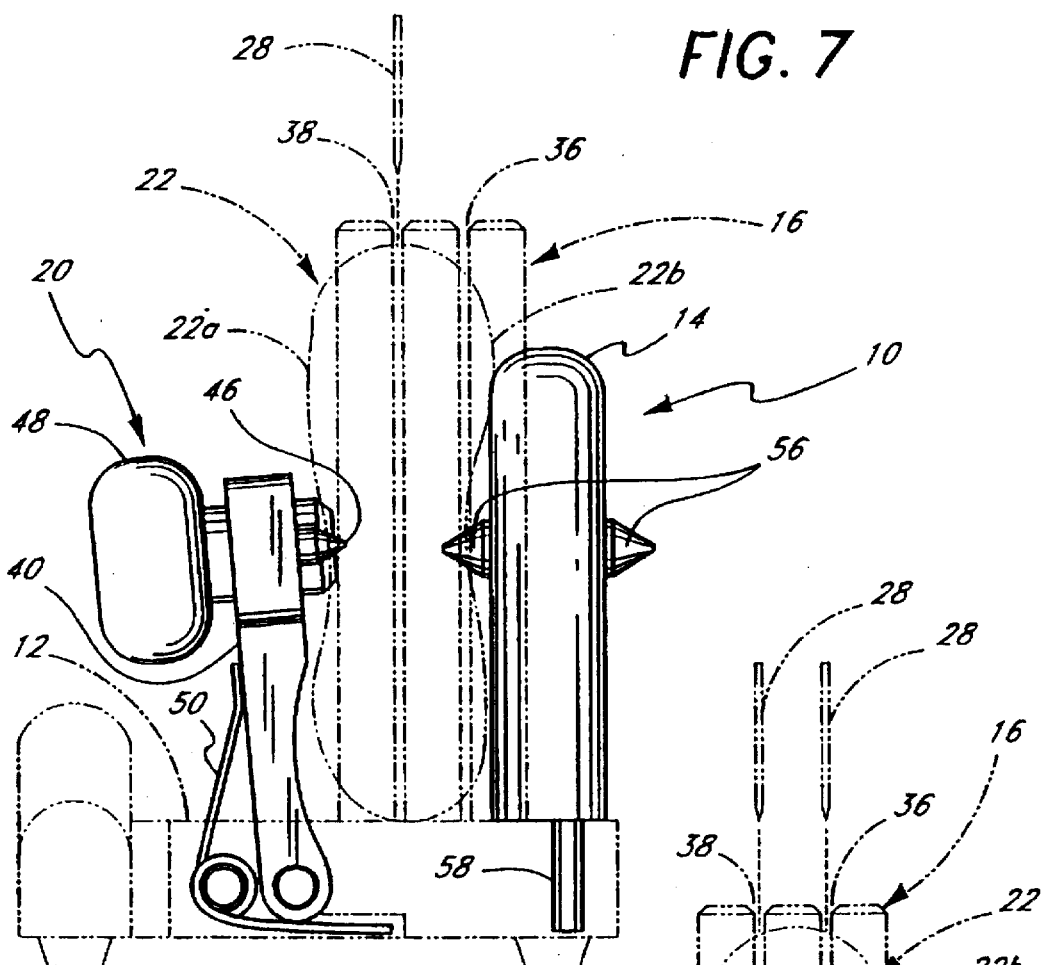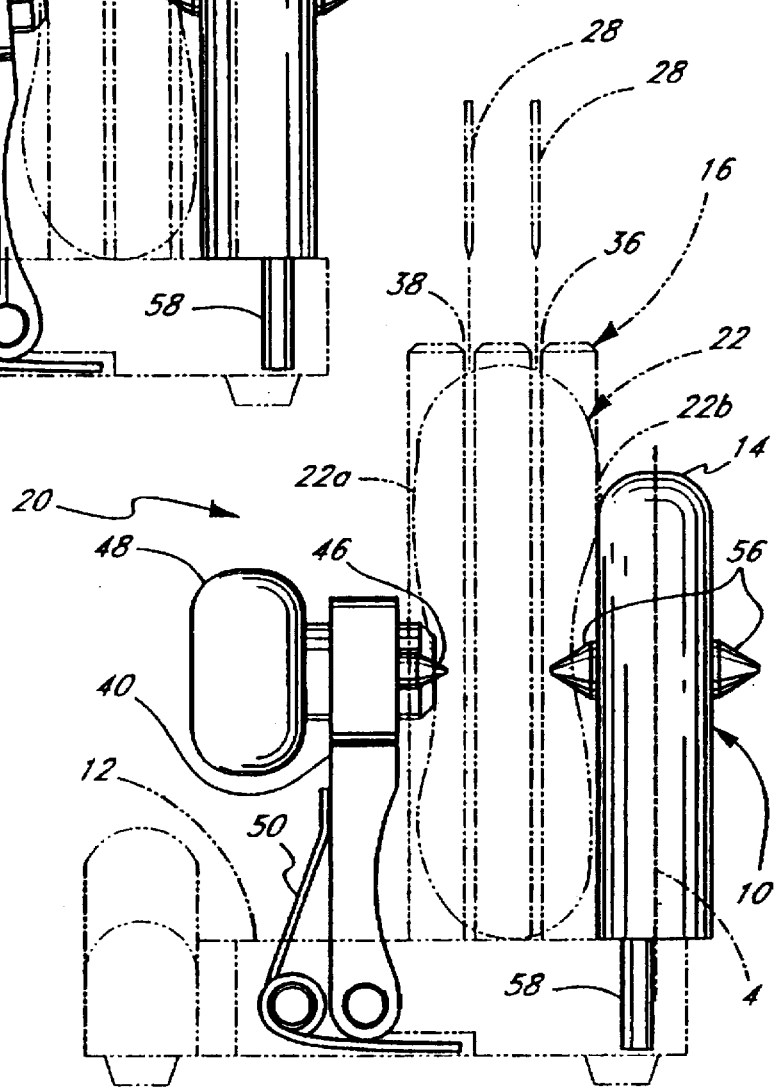

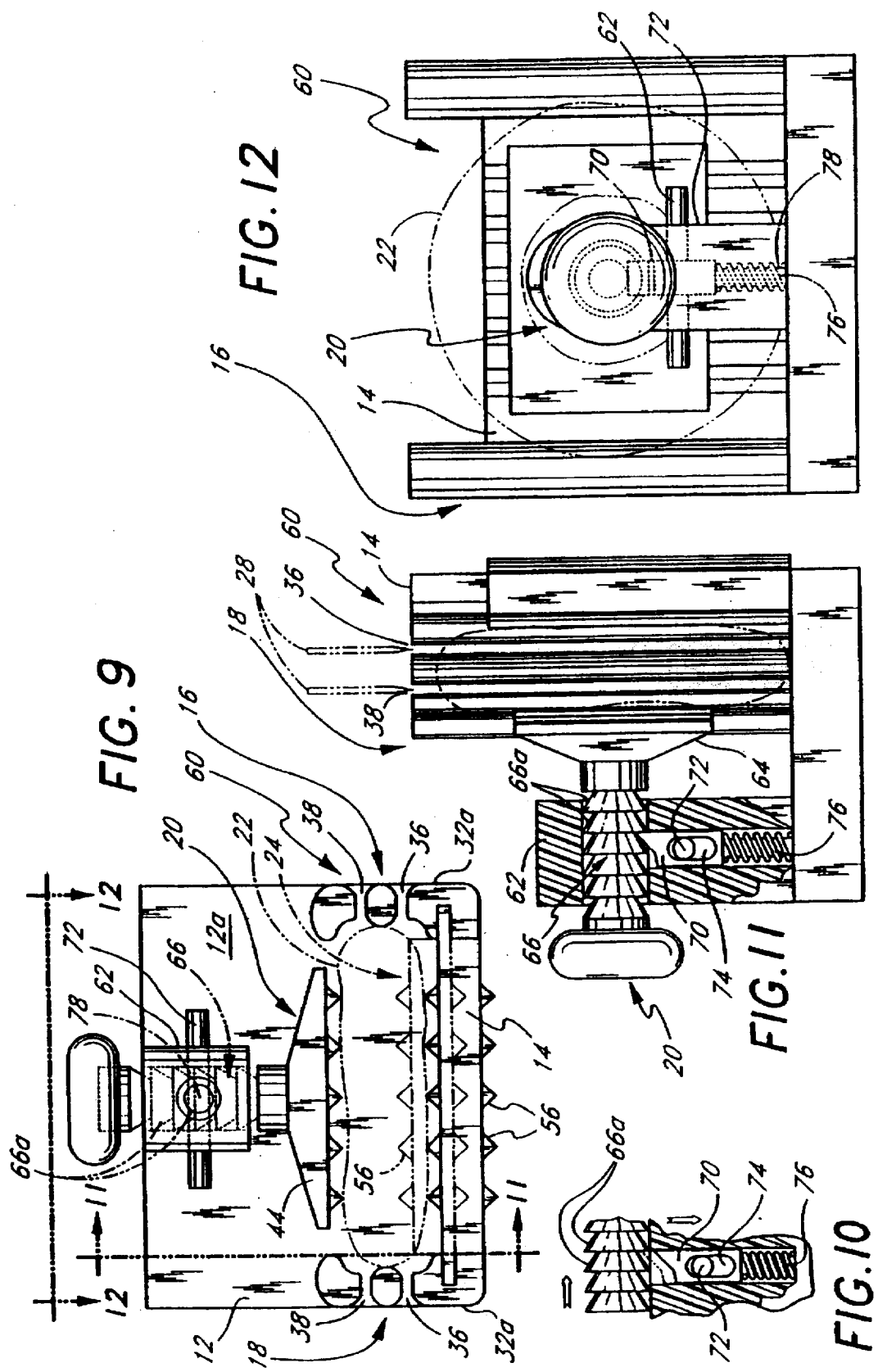

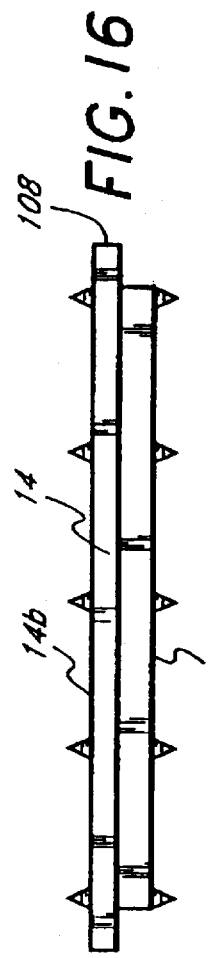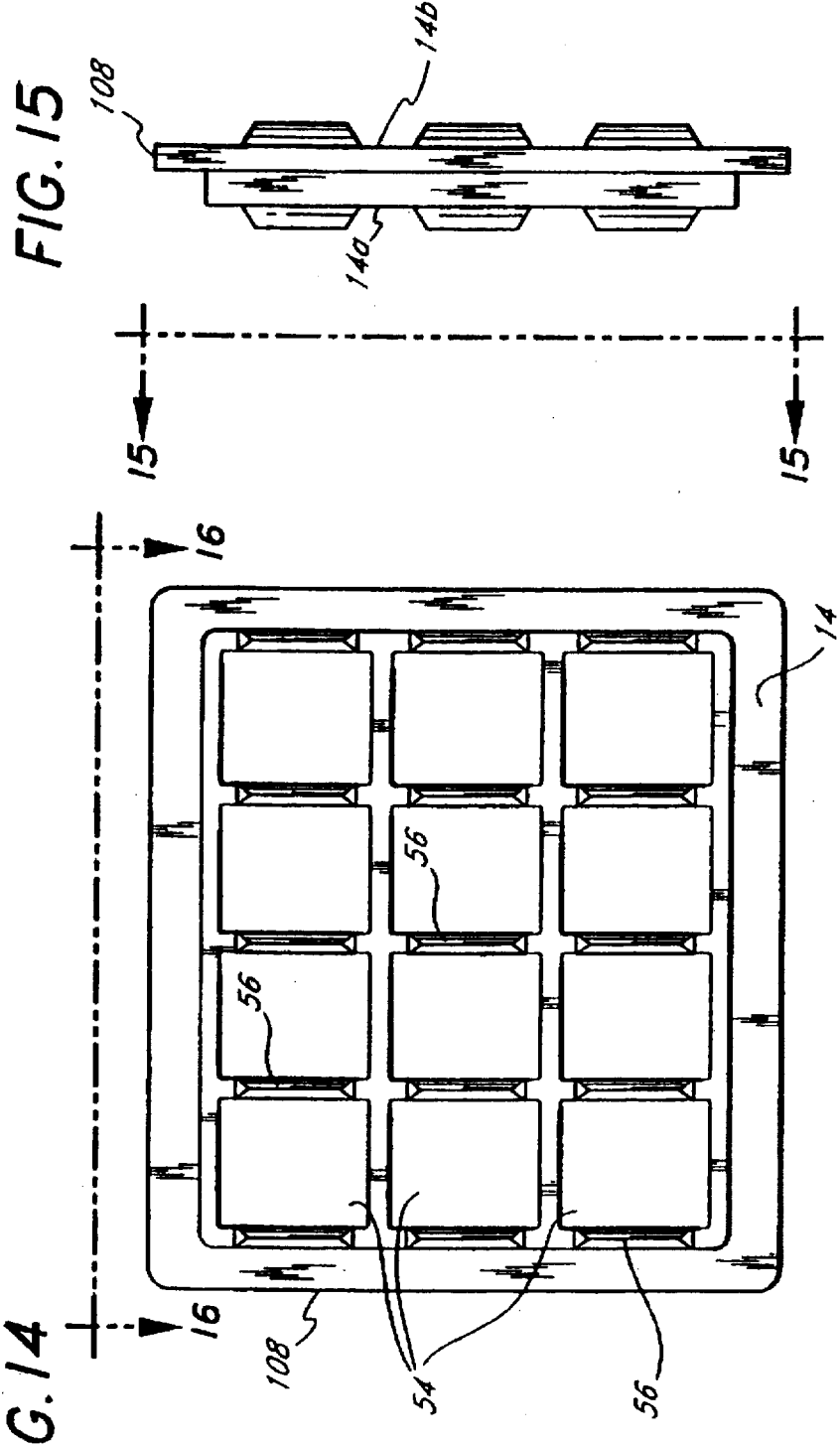

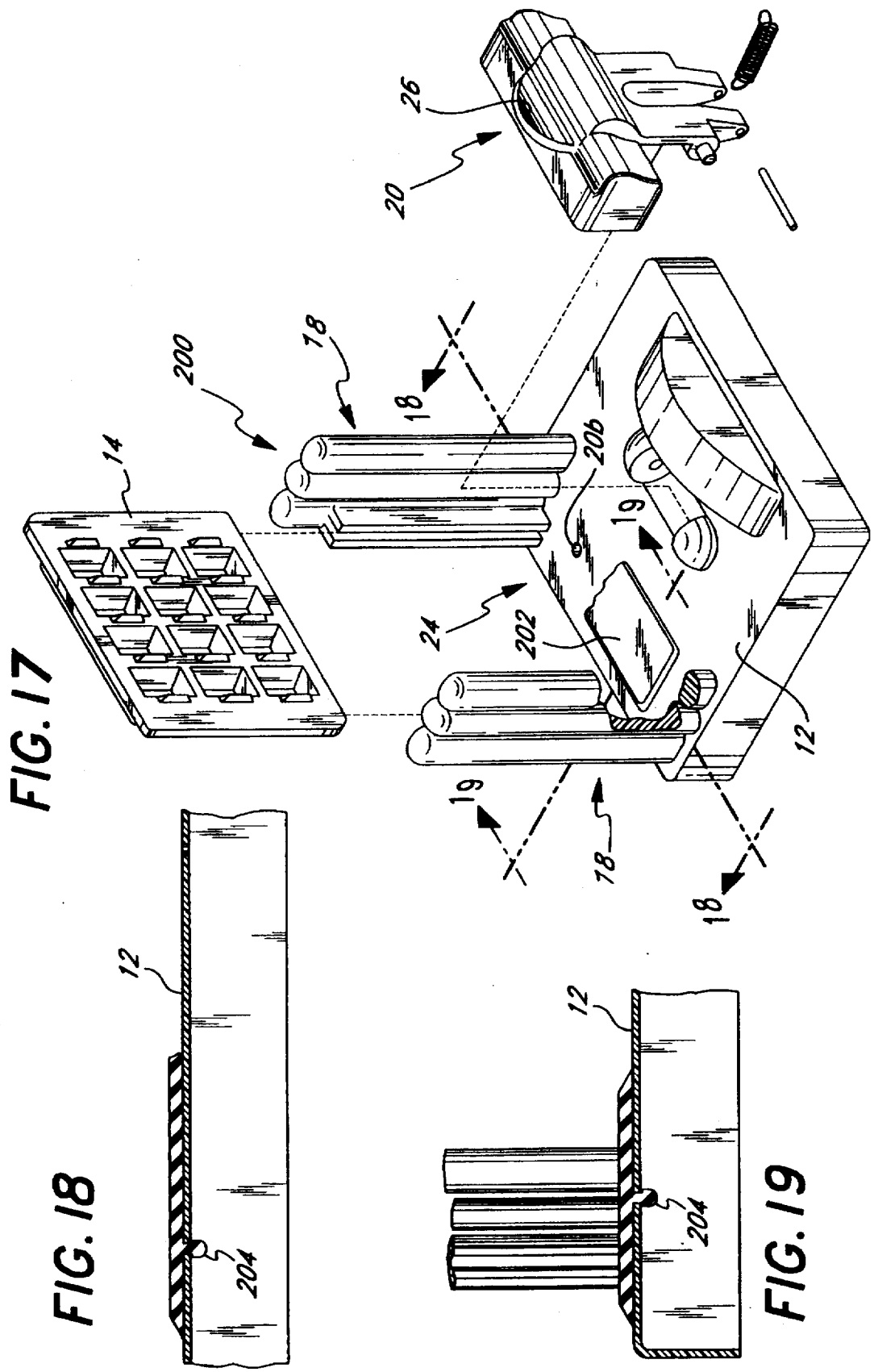

TOOL FOR CUTTING FOOD PRODUCTS

RELATED PATENT APPLICATIONS

This application is a continuation-in-part application of U.S. Ser. No. 08/033,899, entitled "Bagel Slicer," filed Mar. 19, 1993, now U.S. Pat. No. 5,361,666. This related application is incorporated herein by reference and made a part of this application.

BACKGROUND OF THE INVENTION

1. Field of the Invention

This invention relates to a tool used to hold safely a bagel while it is being sliced, and particularly, one which allows the user by simple manual manipulation of a support plate, to slice the bagel either into half segments, quarter segments, or one-third segments, depending upon the position of the support plate. This invention also relates to a tool with a unique cutting surface that resists being cut when a bagel or other food product is being cut using the tool.

2. Background Discussion

Bagels are usually sliced from edge-to-edge to cut them, typically, into half, quarter, or third segments. It is difficult, however, to accomplish this in a safe and convenient manner. There have been various tools proposed to assist a user in accomplishing this task. The following patents illustrate such tools: U.S. Pat. No. 3,338,282; U.S. Pat. No. 4,343,603; U.S. Pat. No. 4,399,989; U.S. Pat. No. 4,523,505; U.S. Pat. No. 4,546,686; U.S. Pat. No. 4,677,888; U.S. Pat. No. 4,747,331; U.S. Pat. No. 4,776,252; U.S. Pat. No. 4,807,505; U.S. Pat. No. 4,807,862; U.S. Pat. No. 4,948,106; U.S. Pat. No. 4,958,547; U.S. Pat. No. 4,979,419; and U.S. Pat. No. 5,033,193.

SUMMARY OF THE INVENTION

It is the objective of this invention to provide a tool used to slice bagels, or other food products, from edge to edge in a safe and convenient manner.

When specifically designed for cutting bagels, the tool includes a base having a top surface adapted to support a bagel by an edge of the bagel, an upright support removably mounted to the base and having opposed face walls, a pair of knife blade guide members attached to the base opposite each other, and positioning elements interactive with the upright support to regulate the thickness of the sliced segments of the bagel.

When specifically designed for cutting a wide variety of food products. The tool includes a base having a top surface adapted to support the food product, a pair of knife blade guide members attached to the base opposite each other and spaced apart to provide a cutting zone, and a cutting pad in the cutting zone which resists being cut by a knife blade.

The tool of this invention has several features, no single one of which is solely responsible for its desirable attributes. without limiting the scope of this invention as expressed by the claims which follow, its more prominent features will now be discussed briefly. After considering this discussion, and particularly after reading the section entitled, "DETAILED DESCRIPTION OF THE PREFERRED EMBODIMENTS," one will understand how the features of this invention provide its advantages, which include safety, low cost construction, and simplicity and convenience of use.

The first feature of this invention is that the tool is used to hold the bagel upright, resting on its edge, while a user with one hand grasps the tool and with the other hand manually cuts the bagel by slicing the bagel from edge to edge with the blade of a knife. The bagel is placed in a cutting zone between the knife blade guide members, with the edge of the bagel resting on the top surface. The central axis of the bagel is at substantially a right angle to the support, intersecting a central section of the support, and the side of the bagel is pressed firmly against one face wall. Preferably, the upright support is a plate of substantially rectangular configuration with outward extending teeth in the face walls adapted to grip the bagel. A hand rest mounted on the base opposite the upright support is adapted to engage the heel of the palm of a user's free hand upon grasping the tool during slicing of the bagel.

The second feature is that each guide member is positioned near one of the opposed lateral sides of the upright support and spaced apart to provide the cutting zone. This cutting zone has a width at least as wide as the width of the bagel to allow the user to position the bagel between the guide members with a side of the bagel next to one of the face walls. Preferably, each guide member extends outward at a right angle from the top surface of the base, and each includes a pair of space apart slits that extend from about the top surface of the base in a straight line at substantially a right angle to the top surface and terminate in an access opening for the blade of the knife. The pairs of slits in each guide member are in registration so that the knife blade may be placed into two directly opposed slits, one slit in each of the guide members, and manually forced through a bagel in the cutting zone, slicing the bagel positioned between the guides members from edge to edge.

The third feature is that the interaction between the positioning elements and the upright support determines the distances between the one face wall of the support that is next to the cutting zone and the slits in the guide members to enable the bagel to be sliced into segments of different thicknesses. The positioning elements interact with the upright support by removal of the support and reversing the position of the support by remounting in a reverse orientation so that the positions of the face walls are reversed. Consequently, the one face wall that was initially next to the cutting zone changes its position and the other face wall is moved next to the cutting zone. With the support in one position and the bagel positioned in the cutting zone, the directly opposed slits are aligned so that slicing the bagel results in the bagel segments being either approximately half segments or ¼ segments depending on which pair of slits are used, and, with the support in the reverse position and the bagel positioned in the cutting zone, the directly opposed slits are aligned so that slicing the bagel results in the bagel segments being approximately ⅓ segments.

The fourth feature is that the positioning elements may comprise post elements extending outward from a bottom edge of the upright support. The post elements are received in positioning holes in the base which determine distances between the one face wall and the slits. The post elements lie along a common axis which is offset relative to, and parallel, a central longitudinal axis of the support. Alternately, the positioning elements may comprise opposed guideways on the guide members which slideably receive, respectively, the opposed lateral sides of the upright support.

The fifth feature is that the tool includes a movable member between the upright support and the hand rest. The movable member is moved by the user into engagement with a bagel in the cutting zone and bears firmly against the bagel, pressing the bagel between the movable member and the support while the bagel is being sliced. In one embodiment

3 of this invention, the movable member is pivotally mounted to the base and spring biased to move the movable member towards the support. In another embodiment, the movable member is a ratchet and pawl mechanism. Preferably, the movable member has a guard plate with outward extending teeth which engage a bagel in the cutting zone.

The sixth feature is that the structural relationship between the movable member with the guard plate, knife blade guides, and the support, provides a tool which protects against accidental, self inflicted wounds which are common using conventional techniques for slicing bagels.

The seventh feature is that the base preferably has a top surface made of a polymeric material that resist being cut by the blade of the knife as the blade cuts through the bagel, or other food product, being supported on the top surface. Optionally a cutting pad made of the polymeric material is mounted in the cutting zone. Preferably, the cutting pad is removably attached to the base. It has a preferred thickness of from about 1/16 inch to about 1/4 inch. The best polymeric material is a polyurethane, such as, for example, a polyester based thermoplastic polyurethane having a Shore A hardness between 75 and 100.

BRIEF DESCRIPTION OF THE DRAWING

The preferred embodiment of this invention, illustrating all its features, will now be discussed in detail. This embodiment depicts the novel and non-obvious method and device of this invention shown in the accompanying drawing, which is for illustrative purposes only. This drawing includes the following figures (Figs.), with like numerals indicating like parts:

FIG. 1 is a perspective view of the first embodiment of the tool of this invention showing a bagel being placed in the tool.

FIG. 2 is a perspective view similar to that shown in FIG. 1 with the bagel shown in dotted lines positioned in the tool and being sliced by a user.

FIG. 3 is an exploded perspective view of the tool shown in FIGS. 1 and 2.

FIG. 6 is a side elevational view of the tool, depicting the alternate positions of the support plate.

FIG. 7 is a schematic view of a bagel held within the cutting zone of the tool, depicting the support plate in a first position, facilitating slicing the bagel into one-half segments.

FIG. 8 is similar to FIG. 7, depicting the support plate in a second position, facilitating slicing the bagel into one-third segments.

FIG. 9 is a plan view of the second embodiment of this invention.

FIG. 10 is a fragmentary view of the ratchet and pawl mechanism used to hold the bagel in the cutting zone.

FIG. 11 is a cross-sectional view taken along line 11—11 of FIG. 9.

FIG. 12 is a front elevational view taken along line 12—12 of FIG. 9.

FIG. 14 is a front elevational view of the support plate shown in FIG. 13.

4

Figure 4:
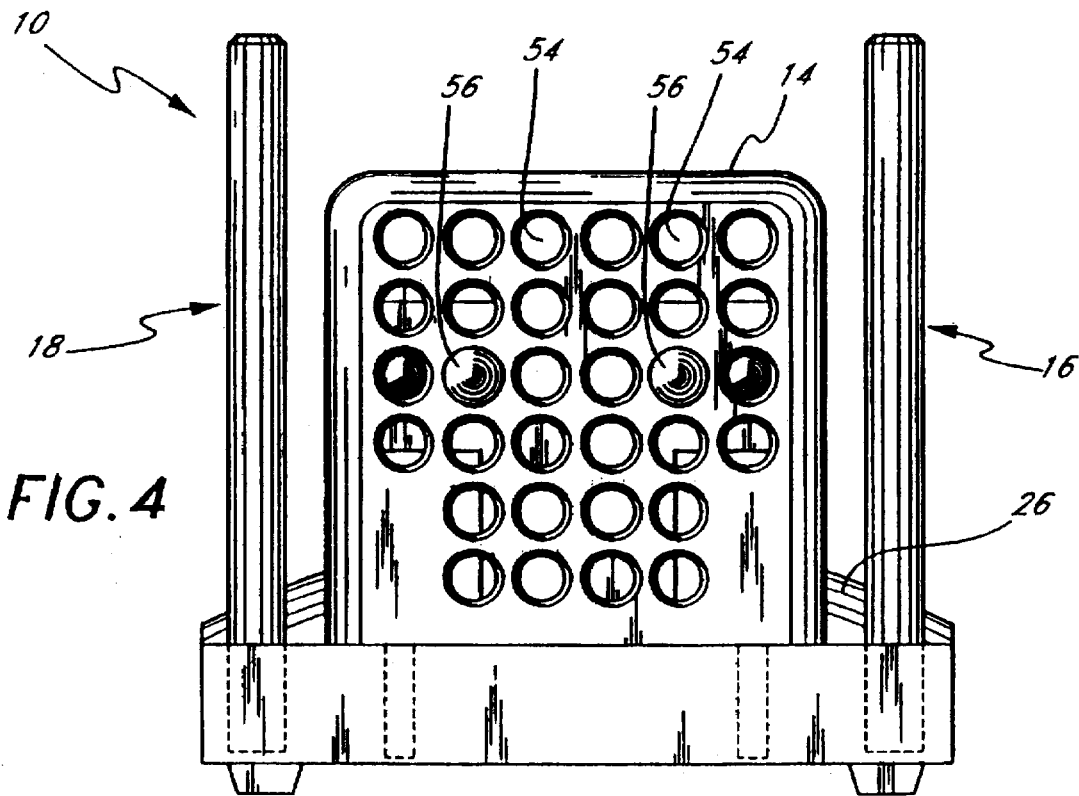
FIG. 4 is a rear elevational view of the first embodiment of the tool of this invention.
Figure 5:
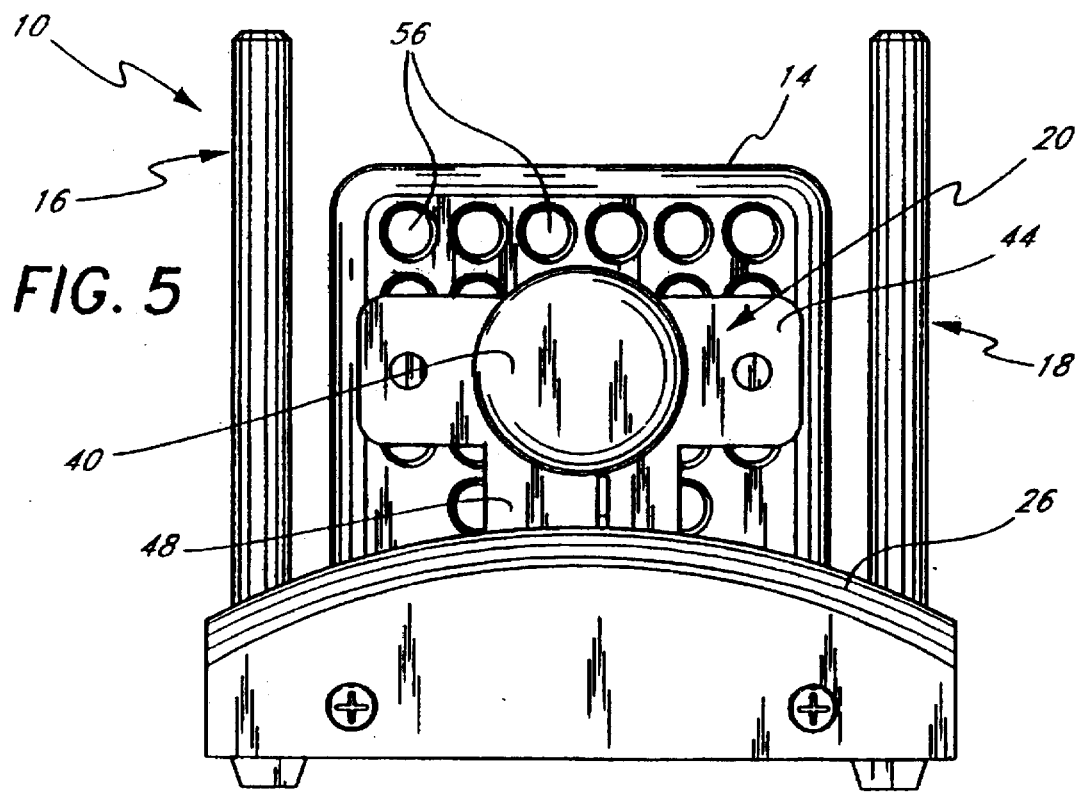
FIG. 5 is a front elevational view of the tool shown in FIG. 1.

FIG. 15 is a side elevational view taken along line 15—15 of FIG. 14.

FIG. 16 is a side elevational view taken along line 16—16 of FIG. 14.

FIG. 17 is an exploded perspective view of the fourth embodiment of this invention.

FIG. 18 is a cross-sectional view taken along line 18—18 of FIG. 17.

FIG. 19 is a cross-sectional view taken along line 19—19 of FIG. 17.

DETAILED DESCRIPTION OF THE PREFERRED EMBODIMENTS

There are four embodiments of this invention. The first embodiment, the tool 10, is illustrated in FIGS. 1 through 8. The second embodiment, the tool 60, is illustrated in FIGS. 9 through 12. The third embodiment, tool 100, is illustrated in FIGS. 13 through 16. The fourth embodiment, tool 200, is illustrated in FIGS. 17 through 19. All four embodiments include a base 12; an upright support plate 14 removably attached to the base; a pair of knife-blade guides 16 and 18 mounted in a stationary position to the base opposite each other; and a moveable bagel holder 20 which holds a bagel 22 in position in a cutting zone 24 (FIGS. 3, 9, 13, and 17) between the guides 16 and 18. A hand-rest 26 (not present in tool 60) is also attached to the base 12. The user moves the bagel holder 20 away from the support plate 14 and inserts the bagel 22 between the guides 16 and 18. As depicted in FIG. 2., with one hand (for example, the user's left hand), the holder 20 is pressed against the bagel 22 in the cutting zone 24, and with the other hand (in this example, the right hand) holding a knife 30, the blade 28 of the knife 30 slices the bagel 22 safely from edge-to-edge.

In tools 10 and 100, each guide 16 and 18 comprises three posts 32, 33, and 34 aligned in a row. In tool 60, the support plate 14 is designed with inward curving lateral walls 32a that are equivalent to the posts 32. The posts 32, 33, and 34 are spaced apart a sufficient distance to provide two slits 36 and 38 in each guide that allow the knife blade 28 to fit between adjacent posts. The slits 36 and 38 extend from the top surface 12a of the base 12 terminating in an access openings for the knife blade 28. Each post is positioned so that the slits 36 and 38 of each guide 16 and 18 are directly opposite each other and in registration so that the knife blade 28 will move into the access openings of the opposed guides 16 and 18 to cut the bagel 22 from edge-to-edge along a plane which is substantially at a right angle to the top surface 12a of the base 12. As depicted in FIGS. 1 and 2, the bagel 22 is positioned between the holder 20 and the support plate 14 so that the central axis of the bagel 22 intersects with the central portion of the support plate 14. The side 22b (FIGS. 7 and 8) of the bagel 22 is pressed snugly against the support plate 14 by the user pressing against the holder 20, which engages the other side 22a of the bagel. Typically, the bagel 22 has a thickness of about an inch and one-half, and is generally of a circular configuration, having a diameter of about four inches. Thus, the guides 16 and 18 are preferably spaced apart from each other a distance slightly greater than about four inches.

In tools 10 and 100, the holder 20 is spring-biased. It comprises an arm 40 pivotally mounted within a central opening 42 within the base 12. There is a guard plate 44 at the top of the arm 40 with a pair of outwardly extending teeth 46 from one side of the plate and a knob 48 extending outward from the other side of the plate. A spring 50 is seated in the opening 42, with one end in a recess 52 (FIG.

8) in the underside of the base 12, and its other end baring against the arm 40, tending to push the arm towards the support plate 14. As shown in FIG. 6, the user grasps the knob 48 and pulls the arm 40 away from the support plate 14, inserting the bagel 22 between the holder 20 and the support plate 14. When the user releases the knob 48, the guard plate 44 presses the bagel 22 firmly against the support plate 14.

In accordance with one of the important features of this invention, the support plate 14 is adapted to be removed from the base 12 and re-oriented as shown in FIG. 6. The support plate 14 preferably has a rectangular configuration with a pre-determined thickness, typically ranging from about one-half inch to one inch. There are a number of holes 54 in the support plate 14 which saves on material cost particularly when the tool is made of plastic. Extending outwardly from the support plate 14 are teeth 56 which assist in gripping the bagel 22 inserted between the holder 20 and plate 14. At the bottom of the support plate 14 are a pair of spaced-apart aligned posts 58. The posts are received in holes 59 along an edge of the base 12. These posts 58 are offset with respect to the central axis x (FIG. 8) of the support plate 14. Thus, with the support plate 14 in one position (as illustrated in FIG. 7), the bagel 22 will be positioned so that the opposed slits 38 will correspond to approximately the center of the bagel 22. Thus, when the user slices the bagel 22 from edge-to-edge using these aligned slits 38 as a guide for the knife blade 28 shown in dotted lines, the bagel 22 is cut into approximately half segments. As depicted in FIG. 7 with the knife blade 28 shown in solid lines, instead of slicing the bagel into ½ segments, the user could use the aligned slits 36 as guides a cut away the ¼ forward edge of the bagel 22. This ¼ segment would be removed and the remaining portion of the bagel pressed against the support plate 14 by bearing against the knob 20, allowing the user to slice another ¼ segment using the slits 36 as guides for the blade 28. This procedure could be repeated again until the entire bagel was cut into ¼ segments. As shown in FIG. 8, by removing the support plate 14 and reversing its orientation, and then reinserting the posts 58 in the holes 59 in the base 12, the bagel 22 will now be positioned in the cutting zone 24 to allow the user to cut the bagel 22 from edge-to-edge twice, so that the bagel 22 is severed into three segments, each approximately one-third the thickness of the bagel 22. The combination of support plate 14, guide members 16 and 18, and holder 20, protect the user against accidental self-inflicted wounds.

The principal difference between the tool 10 and the tool 60 is that the holder 20 instead of being string-biased is a ratchet and pawl-type mechanism. As depicted in FIGS. 9 through 12, the holder 20 includes a support bar 62 centrally located on the base 12 directly opposite the support plate 14. The support bar 62 supports a ratchet element 66 extending outward through a hole 68 (FIG. 11) in the bar. The support bar 62 may also be used as a hand rest. At one end of the ratchet element 66 is a plate 64 and at the opposite end is the knob 48. The ratchet element 66 includes a series of conical teeth 66a which interact with a pawl 70 carried within a cavity 62a in the bar 62. This ratchet element 66 includes a pin 72 extending through an elongated orifice 74 (FIG. 10) that allows the user to push the pin downward, moving the pawl 70 downward against the action of a coiled spring 76 carried on a upwardly extending post 78. This spring 76 tends to push the pawl 70 upward into the bite between the conical teeth 66a to hold the ratchet element 66 in a fixed position. First, the user pushes against the knob 48, forcing the plate 64 against the bagel 22 as shown in FIG. 11. The pawl 70 moves upward to engage the teeth 66a to hold the ratchet element 66 in position. As depicted in FIG. 11, the removable support plate 14 is positioned to accommodate slicing the bagel 22 from edge-to-edge in one-third segments. Depressing the pin 72 disengages the pawl 70. The ratchet element 66 instead of employing the series of conical teeth 66a, could use conventional screw type teeth to allow the user to rotate the knob 48 to tighten the plate 64 snug against the bagel 22.

Figure 13:
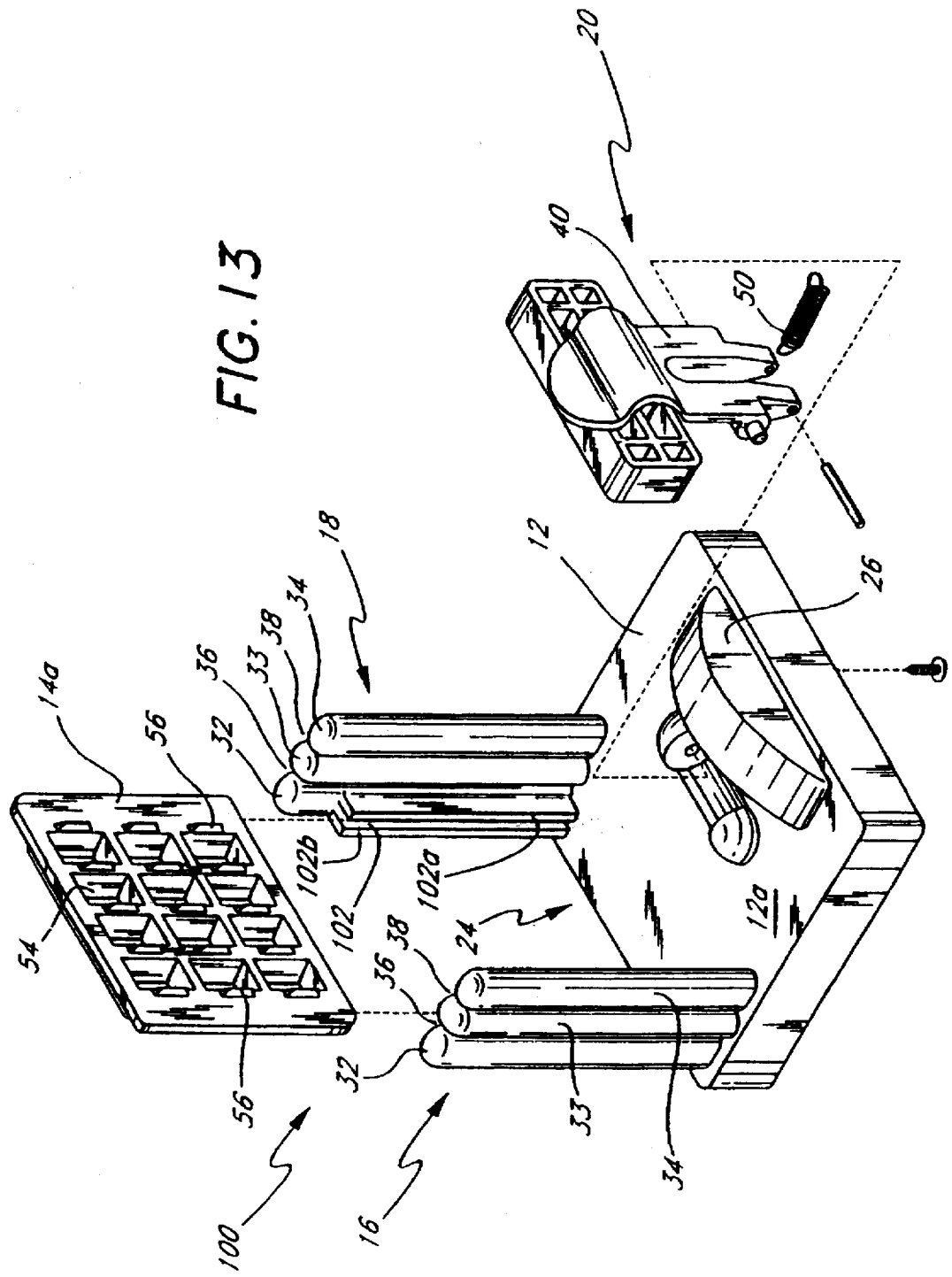
FIG. 13 is an exploded perspective view of the third embodiment of this invention.

The third embodiment of this invention, the tool 100, is similar to that shown in FIGS. 1 through 3, except that it is made of plastic molded components and the support plate 14 is mounted to move within aligned, positioning guideways 102 on the posts 32. Only one guideway is shown in FIG. 13, which comprises a pair of spaced-apart wall elements 102a and 102b which are integral with the post 32. On the opposite post 32 is a second guideway directly opposite the guideway 102 shown in FIG. 13. The support plate 14 includes opposed faces 14a and 14b (FIG. 16) with an offset positioning rim 108 that interacts and moves along the guideways 102. By lifting the support plate 14 up and out of the guideways 102 as shown in FIG. 13, and then reversing its orientation, the positions of the faces 14a and 14b are reversed. Thus, the distance between the face, either face 14a or face 14b depending on the position of the support plate 14, that is next to the cutting zone 24 and the slits 36 and 38 is varied to enable the bagel 22 to be sliced into segments of different thicknesses as discussed previously. The guideways 102 act as positioning elements which interact with the support plate 14 by removal of the support plate and reversing its position by remounting in a reverse orientation. The positions of the faces are reversed, with one face that is next to the cutting zone 24, changing its position, and the other face being moved next to the cutting zone 24.

As illustrated in FIGS. 17 though 19, the fourth embodiment 200 includes a cutting pad 202 removably attached to the base 12. This cutting pad 202 has a generally rectangular configuration, and is relatively thin, having a thickness of from about ¹⁄₁₆ inch to about ¼ inch. It has a pair of bulbous fingers 204 (only one finger shown) that are forced through aligned holes 206 (only one hole shown) in the base 12. The diameters of the holes 206 are slightly less than the fingers 204, so the fingers are compressed upon squeezing through the holes. These fingers 204 expand after being forced through the holes 206 to hold the cutting pad 202 to the base. The pad 202, however, may be removed by simply manually pulling it off the base 12.

In accordance with this invention, the cutting pad 202 is made of a polymeric material that resist being cut by the blade 28 of the knife 30 as it slices through the bagel 22 or other food product. The best polymeric material is a polyurethane, such as, for example, a polyester based thermoplastic polyurethane having a Shore A hardness between 75 and 100. The preferred material is made by BASF Corporation and sold under the trademark ELASTOLLAN®. The following Table sets forth typically physical properties of various grades of this material.

TABLE

| Physical properties | Units | ASTM Method | S-80A | S-85A | S-88A | S-90A | S-95A | S-98A | S-60D | S-64D | S-74D |
|---|---|---|---|---|---|---|---|---|---|---|---|
| Specific gravity | gr/cc | D-792 | 1.21 | 1.22 | 1.22 | 1.23 | 1.23 | 1.24 | 1.25 | 1.25 | 1.26 |
| Hardness | Shore A | D-224 | 80 ± 2 | 84 ± 4 | 88 ± 2 | 92 ± 2 | 96 ± 2 | 98 ± 2 | — | — | — |
|  | D |  | — | — | 36 ± 2 | 41 ± 2 | 46 ± 2 | 53 ± 2 | 60 ± 2 | 64 ± 2 | 73 ± 2 |
| Tensile strength | MPa | D-412 | 38 | 40 | 40 | 40 | 40 | 40 | 35 | 35 | 35 |
|  | psi |  | 5500 | 5800 | 5800 | 5800 | 5800 | 5800 | 5100 | 5100 | 5100 |
| Tensile stress |  | D-412 |  |  |  |  |  |  |  |  |  |
| @ 100% | MPa |  | 5.3 | 6.9 | 9.1 | 11 | 14 | 18 | 20 | 24 | 33 |
| elongation | psi |  | 770 | 1000 | 1300 | 1600 | 2000 | 2600 | 2900 | 3500 | 4800 |
| @ 300% | MPa |  | 9.0 | 12 | 14 | 17 | 22 | 27 | 27 | 28 | 35 |
| elongation | psi |  | 1300 | 1750 | 2000 | 2450 | 3200 | 3900 | 3900 | 4050 | 5100 |
| Elongation @ brk | % | D-412 | 700 | 600 | 580 | 560 | 530 | 485 | 450 | 450 | 385 |
| Tensile set @ brk | % | D-412 | 45 | 35 | 45 | 55 | 90 | 80 | 110 | 135 | 155 |
| Tear strength | kN/m | D-624 | 100 | 105 | 120 | 136 | 160 | 183 | 190 | 225 | 270 |
|  | pli | DIE C | 570 | 600 | 685 | 775 | 915 | 1050 | 1085 | 1285 | 1500 |
| Abrasion resistance | mg (Loss) | D-1044[1] (Taber) | 25 | 25 | 25 | 25 | 50 | 70 | 50 | 50 | 50 |

Test samples were cured 20 hours @ 100° C. before test.
[1]H-18 wheel, 1000 gm weight and 1000 cycles.
Elastollan S series of products are polyester-based thermoplastic polyurethanes that exhibit good hydrolytic stability. They also exhibit good oil, fuel and solvent resistance. These products can be injection and blow molded and extruded.
Extrusion grades S80A, S85A, and S90A
Injection molding grades: S80A to S74D
All grades should be dried before processing. Elastollan products can be stored for up to 6 months in their original container. Containers should be stored in a cool, dry area.

SCOPE OF THE INVENTION

The above presents a description of the best mode contemplated of carrying out the present invention, and of the manner and process of making and using it, in such full, clear, concise, and exact terms as to enable any person skilled in the art to which it pertains to make and use this invention. This invention is, however, susceptible to modifications and alternate constructions from that discussed above which are fully equivalent. Consequently, it is not the intention to limit this invention to the particular embodiment disclosed. On the contrary, the intention is to cover all modifications and alternate constructions coming within the spirit and scope of the invention as generally expressed by the following claims, which particularly point out and distinctly claim the subject matter of the invention:

I claim:

1. A tool used to hold upright a bagel of a given width and having opposed sides, resting on an edge of the bagel, while a user with one hand grasps the tool and with the other hand manually slices the bagel into segments of selected thicknesses by slicing the bagel from edge to edge with a blade of a knife, including a base having a top surface which supports the bagel by the edge of the bagel, an upright support removably mounted to the base and having opposed lateral sides and opposed face walls, a pair of knife blade guide members attached to the base opposite each other, each guide member positioned near one of the opposed sides of the upright support and spaced apart to provide a cutting zone, and positioning means interactive with the upright support to regulate the thickness of the sliced segments of the bagel, said positioning means interacting with the upright support by removal of said support and reversing the position of said support by remounting in a reverse orientation so that the positions of the face walls are reversed, with the one face wall that is next to the cutting zone changing its position and the other face wall being moved next to the cutting zone, and a movable member adjacent the upright support that is moved by the user into engagement with the bagel in the cutting zone and bears firmly against the bagel, pressing the bagel between the movable member and the support while the bagel is being sliced, and a cutting pad in said cutting zone, said pad comprising a polyester based thermoplastic polyurethane having a Sore A hardness between 75 and 100 that resists being cut by the blade of the knife as the blade cuts through the bagel being supported on said top surface of said support.

2. The tool of claim 1 where said cutting pad is removably attached to the base.

3. The tool of claim 1 where said cutting pad has a thickness of from 1/16 inch to 1/4 inch.

* * * * *